United States Patent
Cordes (10) Patent No.: US 9,146,654 B2
(45) Date of Patent: Sep. 29, 2015

(54) MOVEMENT REDUCTION WHEN SCROLLING FOR ITEM SELECTION DURING DIRECT MANIPULATION

(75) Inventor: Richard E. Cordes, Chappel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 13/115,614

(22) Filed: May 25, 2011

(65) Prior Publication Data

US 2012/0304122 A1    Nov. 29, 2012

(51) Int. Cl.
*G06F 3/0481*    (2013.01)

(52) U.S. Cl.
CPC ....................................... *G06F 3/0481* (2013.01)

(58) Field of Classification Search
CPC ..................................................... G06F 3/0481
USPC .......................... 715/822, 823, 835, 810, 860
See application file for complete search history.

(56) References Cited

U.S. PATENT DOCUMENTS

| | | | |
|---|---|---|---|
| 5,422,993 A | 6/1995 | Fleming | |
| 5,686,937 A | 11/1997 | Li | |
| 6,147,683 A | 11/2000 | Martinez et al. | |
| 6,323,884 B1 | 11/2001 | Bird et al. | |
| 7,134,093 B2 | 11/2006 | Etgen et al. | |
| 7,707,209 B2 * | 4/2010 | Tanaka | 707/724 |
| 8,065,623 B2 * | 11/2011 | Bohlman | 715/768 |
| 8,094,873 B2 * | 1/2012 | Kelusky et al. | 382/100 |
| 8,543,917 B2 * | 9/2013 | Ketola et al. | 715/712 |
| 8,560,973 B2 * | 10/2013 | Choi | 715/863 |
| 2002/0180809 A1 * | 12/2002 | Light et al. | 345/852 |
| 2005/0243054 A1 * | 11/2005 | Beymer et al. | 345/156 |
| 2006/0168548 A1 | 7/2006 | Kelley et al. | |
| 2006/0288314 A1 | 12/2006 | Robertson | |
| 2008/0198130 A1 | 8/2008 | Baudisch et al. | |
| 2008/0229254 A1 | 9/2008 | Warner | |
| 2008/0267447 A1 * | 10/2008 | Kelusky et al. | 382/100 |
| 2009/0271745 A1 * | 10/2009 | Sakamoto et al. | 715/859 |
| 2010/0017734 A1 * | 1/2010 | Cummins et al. | 715/769 |
| 2010/0070900 A1 * | 3/2010 | Cummins et al. | 715/769 |
| 2010/0153888 A1 * | 6/2010 | Jarosz | 715/856 |
| 2010/0310232 A1 * | 12/2010 | Iwase et al. | 386/241 |
| 2011/0041101 A1 * | 2/2011 | Choi | 715/863 |

(Continued)

OTHER PUBLICATIONS

BetterTouchTool Jan. 5, 2010.*

(Continued)

*Primary Examiner* — Doon Chow
*Assistant Examiner* — David Choi
(74) *Attorney, Agent, or Firm* — DeLizio Law, PLLC (57) ABSTRACT

A method includes receiving a user input to cause movement of a display of a screen of a direct manipulation device, wherein the movement is in a direction away from a target item. The method includes receiving a release input to indicate that the user has released the user input at a release point on the display of the screen. The method also includes determining a location of the release point on the display of the screen relative to selectable items. The method includes determining the target item from among the selectable items, wherein the target item is at a distance from the location of the release point. The method also includes displaying a surrogate selectable item at the release point. The method includes performing an action that is the same as an action that would occur in response to a user selection of the target item.

11 Claims, 4 Drawing Sheets

(56) References Cited

U.S. PATENT DOCUMENTS

| | | | |
|---|---|---|---|
| 2011/0083089 A1* | 4/2011 | Pahud et al. | 715/765 |
| 2011/0138324 A1* | 6/2011 | Sweeney et al. | 715/800 |
| 2011/0145718 A1* | 6/2011 | Ketola et al. | 715/739 |
| 2012/0066627 A1* | 3/2012 | Furukawa et al. | 715/768 |
| 2012/0304122 A1* | 11/2012 | Cordes | 715/822 |

OTHER PUBLICATIONS

"iPad finger anyone?", http://www.mactalk.com.au/57/88286-ipad-finger-anyone.html Obtained from internet on Mar. 3, 2011, Jul. 6, 2010, 8 pages.

"Repetitive Strain Injury", http://en.wikipedia.org/wiki/Repetitive_strain_injury Obtained From internet on Mar. 3, 2011, Feb. 22, 2011, 9 pages.

* cited by examiner

MOVEMENT REDUCTION WHEN SCROLLING FOR ITEM SELECTION DURING DIRECT MANIPULATION

BACKGROUND

Embodiments of the inventive subject matter generally relate to the field of computers, and, more particularly, to movement reduction when scrolling for item selection on the display of a computer.

With the advent of more and more direct manipulation devices (from small mobile devices (e.g., phones) to much larger table personal computers), more physical movement by a user is required to use these devices. In particular, a user's finger, hand, and arm are required to move more distances while touching the screen of these devices for user input. Such required movement can increase the risk or severity of carpal tunnel or repetitive stress injuries. Therefore, the importance of reducing hand and arm movement becomes even more critical as the hardware format for direct manipulation devices increases.

Currently with direct manipulation, user selection of an item on the screen of the device includes physically movement of the finger and selection by pressing the item on the screen with the finger, clicking of a mouse, clicking of a button, etc. Repeated movement of the finger, hand, and arm to correspond to where a target item is located can add up over time and contribute to stress and overuse related pain.

SUMMARY

In some example embodiments, a method includes receiving a user input to cause movement of a display of a screen of a direct manipulation device, wherein the movement is in a direction away from a target item. The method includes receiving a release input to indicate that the user has released the user input at a release point on the display of the screen. The method also includes determining a location of the release point on the display of the screen relative to selectable items. The method includes determining the target item from among the selectable items, wherein the target item is at a distance from the location of the release point. The method also includes displaying a surrogate selectable item at the release point. The method includes responsive to the user selection of the surrogate selectable item, performing an action that is the same as an action that would occur in response to a user selection of the target item.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to direct manipulation devices, some example embodiments provide for movement reduction for any other type of device. In other instances, well-known instruction instances, protocols, structures and techniques have not been shown in detail in order not to obfuscate the description.

Some example embodiments reduce the amount of finger, hand, and arm motion that can occur when scrolling or moving to select an item during direct manipulation. Also, some example embodiments make the user interaction with an interface faster and more efficient. After scrolling or moving the screen and after a user releases (e.g., removes their finger from the screen, left mouse key release, etc.), a surrogate selectable item is displayed at the release point (i.e., the point where the user released). In some example embodiments, the surrogate selectable item includes a selectable object that maps to a visible or nonvisible target item that is distant relative to the release point. In such a configuration, a user only needs to put their finger back down or click the mouse again at the release point to select a high-probability target item. In other words, a user is not required to make additional movement beyond selecting the screen or mouse button again (as the surrogate selectable item is at the release point). The user can select the surrogate selectable item to perform the same action that would occur if the target item (that is at a different location, either visible or nonvisible) is selected. In other words, selecting the surrogate item results in the same action as selecting the target item, but without the user motion.

Determining which item is the most likely target item can be based on a number of different criteria. For example, the selection of the most likely target item can be based on a history or patterns of prior use by the user, other users, etc. For example, a user is most likely to select the target item after selection of a previous target item. While described such that a single target item is represented at the release point by a surrogate selectable item, in some other example embodiments multiple target items can be represented by multiple selectable items on or near the release point. For example, the top four highest probability target items are represented by four different surrogate selectable items at the release point. In some example embodiments, the multiple surrogate selectable items can be clustered around the release point. In some other example embodiments, the multiple surrogate selectable items can be presented serial at the release point. In order to indicate to the user that the surrogate selectable item was about to change, a countdown timer can be displayed, the current surrogate selectable item can start to fade, etc.

Figure 1:
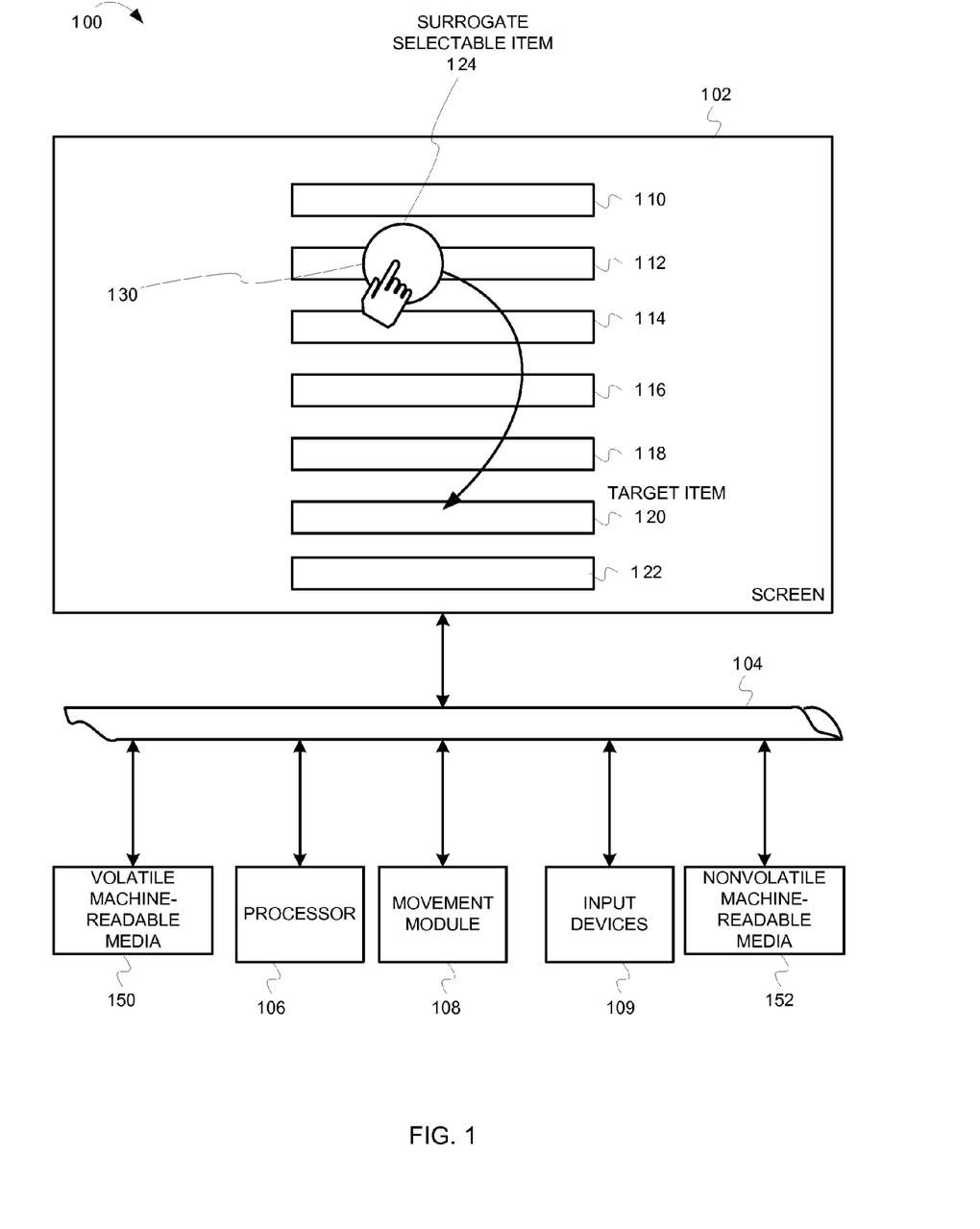
FIG. 1 depicts a system for movement reduction when scrolling for item selection during direct manipulation, according to some example embodiments.

FIG. 1 depicts a system for movement reduction when scrolling for item selection during direct manipulation, according to some example embodiments. FIG. 1 depicts a system 100 that includes a screen 102, a processor 106, a movement module 108, input devices 109, a volatile machine-readable media 150, and a nonvolatile machine-readable media 152 that are communicatively coupled together through a bus 104. FIG. 1 can represent any type of computing device (e.g., a desktop computer, laptop computer, mobile device, etc.). Also the components of FIG. 1 can be in a single device or distributed across two or more devices. Embodiments are described in reference to direct manipulation devices. However, some example embodiments can be incorporated into any type of device that provides for user selection of items.

The processor 106 can be one processor or possibly multiple processors, multiple cores, multiple nodes, and/or implementing multi-threading, etc. The volatile machine-readable media 150 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Although illustrated as being coupled to the bus 104, the volatile machine-readable media 150 may be directly coupled to the processor 106. The nonvolatile machine-readable media 152 can include optical storage, magnetic storage, etc. The input device(s) 114 can include the touchscreen of the screen 102, a keyboard, mouse, microphone, etc. The touchscreen can detect the presence and location of a touch within the display area of the screen 102. The system 100 can include other components not shown in FIG. 1. For example, the system 100 can include a network interface (e.g., an ATM interface, an Ethernet interface, a Frame Relay interface, SONET interface, wireless interface, etc.).

The movement module 108 can be software, firmware, hardware or a combination thereof. For example, the movement module 108 can be software that is loaded into the processor 106 for execution therein. As further described below, the movement module 108 tracks user input and responds according to some example embodiments. For example, the movement module 108 can track the scrolling of the display on the screen 102 based on a touch on the touchscreen. In response, the movement module 108 can scroll the display to track the touch movement by the user on the touchscreen. Also, the movement module 108 can receive the indication from the touchscreen that the user has released their touch from the touchscreen (also providing a location of the release point). In response, the movement module 108 can determine a probable target item based on various criteria relative to the release point (e.g., the particular user, history relative to previously selected items, etc.). The movement module 108 can then cause the display of a surrogate selectable item at the release point. In some example embodiments, the surrogate selectable item includes a selectable object that maps to the probable target item that is distant relative to the release point. In such a configuration, a user only needs to put their finger back down or select a mouse button at the release point to select the probably target item. In other words, a user is not required to make additional movement beyond selecting the screen or mouse button again (as the surrogate selectable item is at the release point). In particular, the user can select the surrogate selectable item to perform the same action that would occur if the target item (that is at a different location, either visible or nonvisible) is selected. In other words, selecting the surrogate item results in the same action as selecting the target item, but without the user motion.

To illustrate, the screen 102 includes a display of different selectable items (an item 110, an item 112, an item 114, an item 116, an item 118, an item 120, and an item 122). These different items can be selectable based on one or more user inputs received by the input devices 109. For example, a user can select any one of these items using a touchscreen overlaying the screen 102, a mouse, a keyboard, etc. This can include direct manipulation. For example, direct manipulation can be done by using a finger to drag (e.g., move) a series of items in a direction away from a target item, in order to bring the target item into view. In this example, the target item includes the item 120. Assume that the item 120 was not viewable and below the display. Accordingly, the user can move the screen upward to bring the item 120 (that is below) viewable on the screen 102. Selection of these selectable items can cause different operations (e.g., start of a new application).

In some example embodiments, the selection of the item as being the target item can be based on different criteria. For example, a history of selections of items (by the specific user, a specific group of users (e.g., based on profession, age group, etc.), users generally), etc.) can be collected and used to predict the probability of each item (either viewable or nonviewable) as being the target item (that is to be selected next by the current user). For example, based on the frequency of prior use, the probability that a given item is the target item can be determined (e.g., Probability (p)=(number of times item was selected)/(# of selectable items). Alternatively or in addition, other criteria can be used to determine the probability of future item selection. For example, there can be certain patterns of usage. As an example, one item is almost always selected after another item. Or, some items are more popular at given times of the month, day, year, time of day, etc. Accordingly, any of a number of different criteria can be applied by the movement module 108 to determine the target item.

The example screenshot on the screen 102 can be representative of a screenshot after a user has scrolled and released their input device (e.g., moved their finger off the touchscreen, unclicked the mouse, etc.). In this example, a release point is defined at the location of a surrogate selectable item 124. After scrolling and after the user releases their input device, the movement module 108 can record the location of this release. In a conventional system, a user would then have to physically move their finger, mouse, etc. to select the new item. Instead, the movement module 108 displays the surrogate selectable item 124 at the release point 130. The surrogate selectable item 124 maps to the target item 120 (the item that has a high probability of being selected next). In this manner, a user only needs to put their finger back down or click the mouse again to select the target item 120—no additional movement is necessary. The surrogate selectable item 124 can an icon, graphic or some other object (e.g., a button) that when selected performs the same action as the target item 120. In some example embodiments, in order to physically identify the item as a surrogate for the target item 120, the surrogate selectable item 124 can use unique properties (if any) of the target item 120 (e.g., color, shape, text, etc.). In some example embodiments, the movement module 108 can display an arrow pointing from the surrogate selectable item 124 to the target item 120 (as shown in FIG. 1). Also, the surrogate selectable item 124 can be semi-transparent so that the items underneath are not obscured. Accordingly, as described, the reduced motion is equal to the distance between the release point 130 and the location of the target item 120. Because the target item 120 can be anywhere relative to the release point 130, the distance saved can vary.

Figure 2:
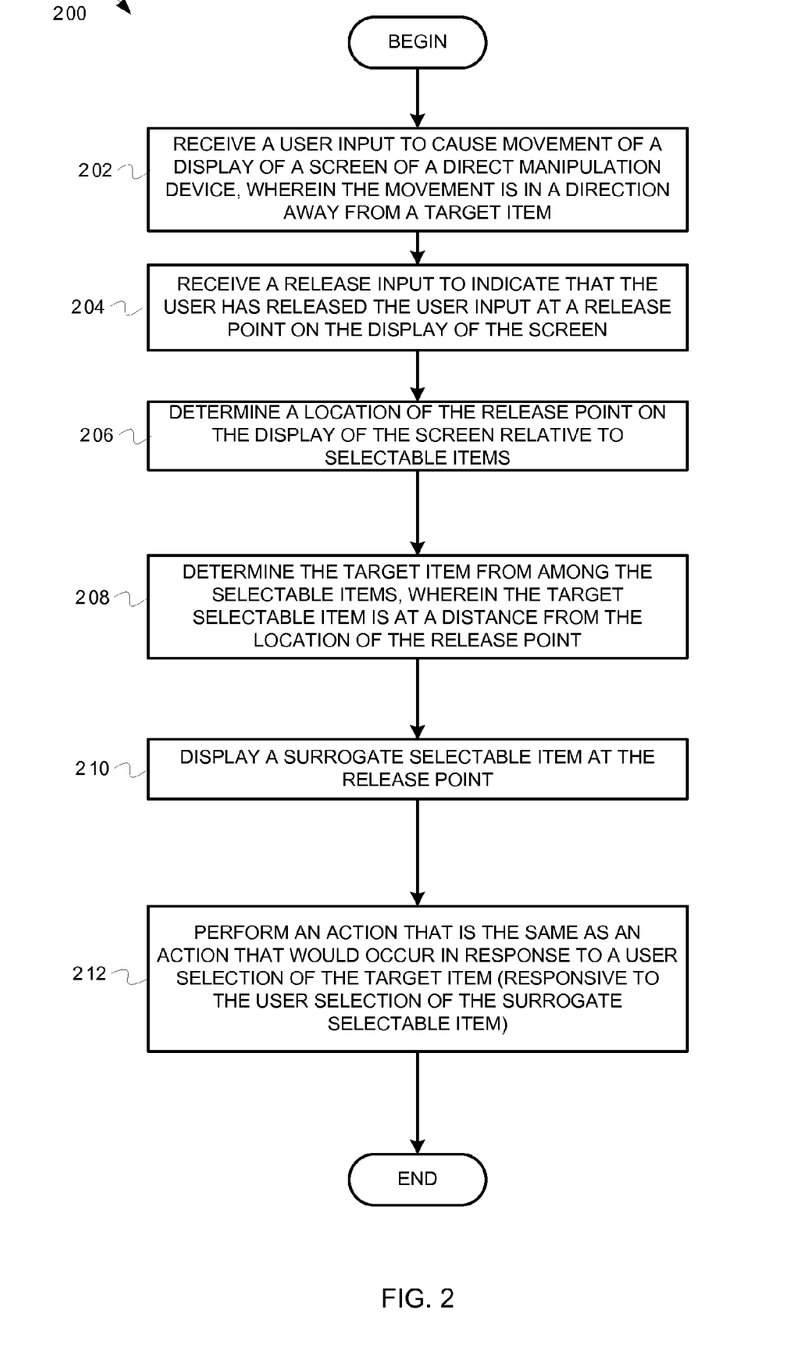
FIG. 2 depicts a flowchart for movement reduction when scrolling for item selection during direct manipulation, according to some example embodiments.

To better illustrate, a flowchart of the operations of the movement module 108 is now described. Also, two screenshots illustrating an example at two different points in time for movement reduction are also described in conjunction with the description of the flowchart. In particular, FIG. 2 depicts a flowchart for movement reduction when scrolling for item selection during direct manipulation, according to some example embodiments. The operations of a flowchart 200 are described with reference to FIG. 1. The operations of the flowchart 200 start at block 202.

At block 202, the movement module 108 receive a user input to cause movement of a display of a screen of a direct manipulation device, wherein the movement is in a direction away from a target item. For example with reference to FIG. 1, the movement module 108 can receive the user input from one or more of the input devices 109 (e.g., touchscreen, mouse, etc.). The user input causes the display to move along a given direction. In some example embodiments, the direction is opposite of a direction away from a target item, in order to bring the target item into view or closer into view.

Figure 3:
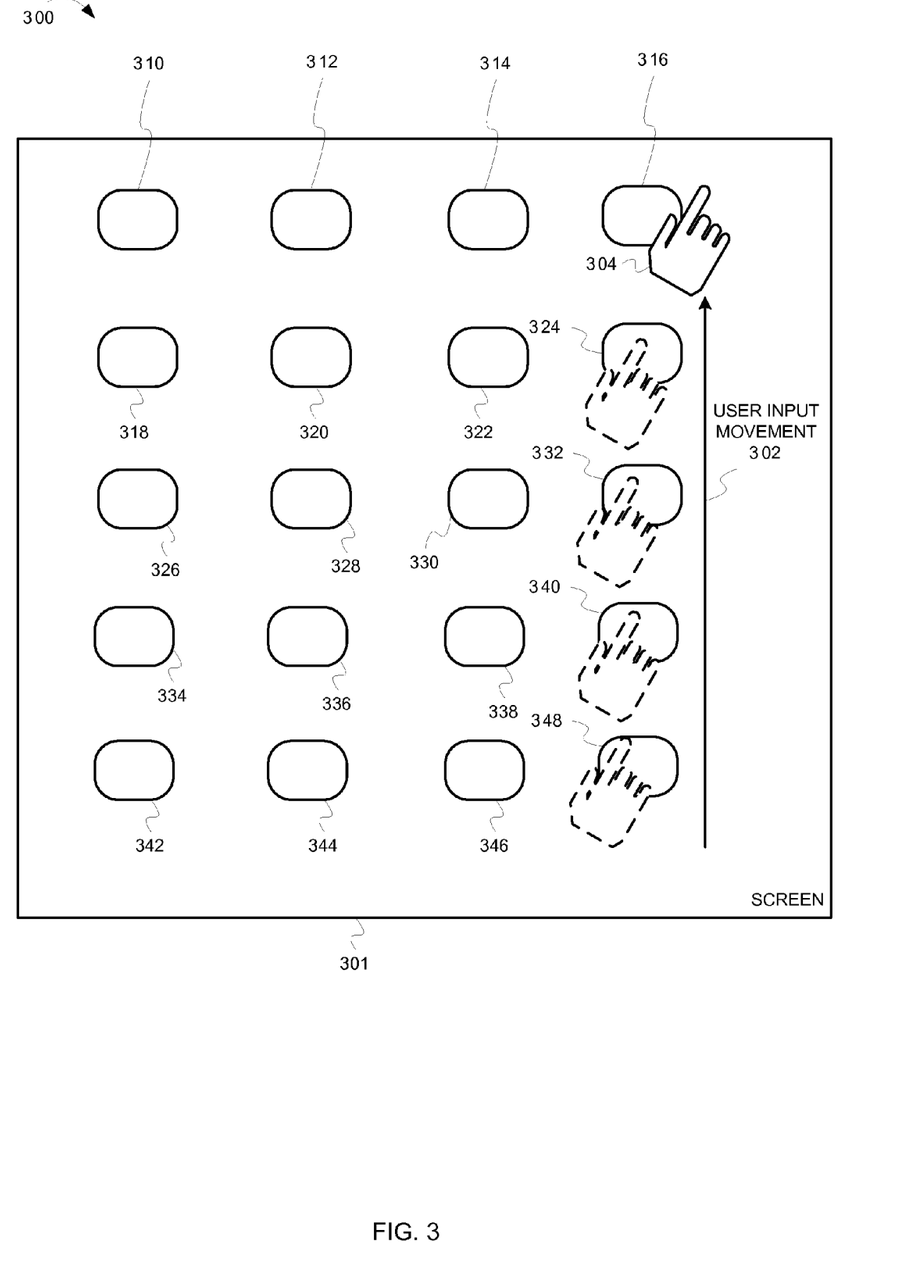
FIG. 3 depicts a screenshot of a Graphical User Interface (GUI) screen illustrating an example at a first time point for movement reduction, according to some example embodiments.

To illustrate, FIG. 3 depicts a screenshot of a Graphical User Interface (GUI) screen illustrating an example at a first time point for movement reduction, according to some example embodiments. In particular, FIG. 3 depicts a screenshot 300 displayed on a screen 301. The screenshot 300 includes a number of selectable items—an item 310, an item 312, an item 314, an item 316, an item 318, an item 320, an item 322, an item 324, an item 326, an item 328, an item 330, an item 332, an item 334, an item 336, an item 338, an item 340, an item 342, an item 344, an item 346, and an item 348. In particular, a user can select (e.g., touch the screen location, mouse selection, etc.) to cause an action to occur (e.g., an application to begin executing). In this example, the screen can be moved in different directions using a finger touch to the touchscreen over the screen 301. Similar movements can occur using a mouse and cursor or other input device (e.g., a keyboard). In this example, a user input movement 302 includes a user's finger 304 that moves from the bottom of the screen 301 (near the item 348) to the top of the screen 301 (near the item 316). Such movement causes the display to move upward such the items thereon move upward. Also, such movement causes items at the top of the screen 301 to be unviewable and items below the bottom of the screen 301 (unviewable) to become viewable. In particular, the row of items 342, 344, 346, and 348 may have been unviewable prior to the user input in the upward direction. Also, rows of items above the row of items 310, 312, 314, and 316 were viewable before the user input in the upward direction (but are unviewable after the user input). Returning to FIG. 2, the operations of the flowchart 200 continue at block 204.

At block 204, the movement module 108 receives a release input to indicate that the user has released the user input at a release point on the display of the screen. With reference to FIG. 1, the movement module 108 can receive the release input from one or more of the input devices 109 (e.g., touchscreen, mouse, etc.). For example, the user can remove their finger from the touchscreen. The operations of the flowchart 200 continue at block 206.

At block 206, the movement module 108 determines a location of the release point on the display of the screen relative to selectable items. With reference to FIG. 1, the movement module 108 can receive the location of the release point from one or more of the input devices 109 (e.g., touchscreen, mouse, etc.). The input devices 109 can provide this location (e.g., x and y coordinates on the screen) along with the indication that the release occurred.

Figure 4:
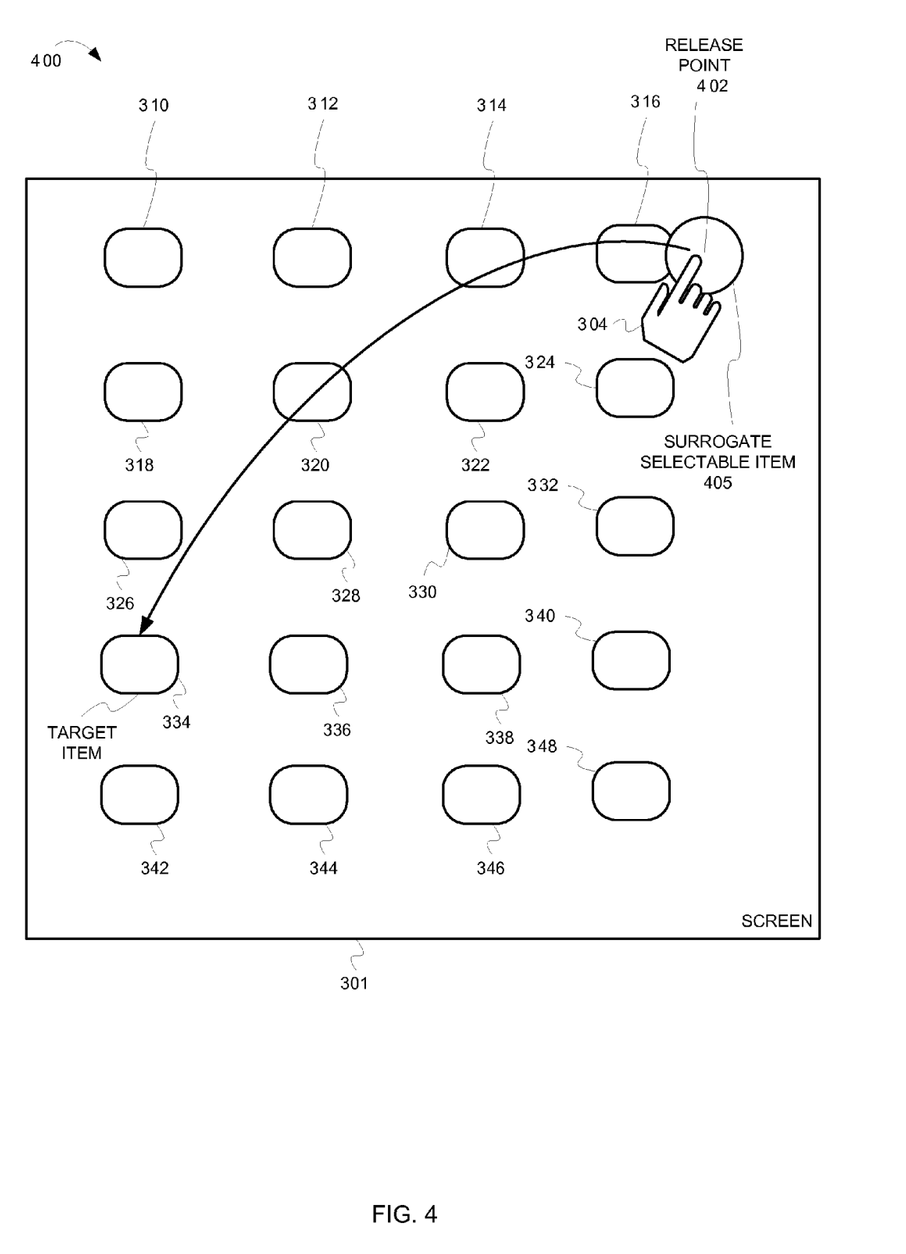
FIG. 4 depicts a screenshot of the GUI screen illustrating the example at a second later time point for movement reduction, according to some example embodiments.

To illustrate, FIG. 4 depicts a screenshot of a GUI screen illustrating the example at a second later time point for movement reduction, according to some example embodiments. In particular, FIG. 4 depicts a screenshot 400 displayed on the screen 301. The screenshot 400 is captured as a later point in time in comparison to the time when the screenshot 300 of FIG. 3 was captured. The screenshot 400 is captured after the user has released the user input at the release point on the display of the screen. This release occurs after the user causes movement of the display (as described above at block 202). The screenshot 400 includes the number of selectable items—the item 310, the item 312, the item 314, the item 316, the item 318, the item 320, the item 322, the item 324, the item 326, the item 328, the item 330, the item 332, the item 334, the item 336, the item 338, the item 340, the item 342, the item 344, the item 346, and the item 348. The screenshot 400 also includes the location of a release point 402 based on the release from the touchscreen by the user's finger 304. The operations of the flowchart 200 continue at block 208.

At block 208, the movement module 108 determines the target item from among the selectable items, wherein the target item is at a distance from the location of the release point. With reference to FIG. 4, the movement module 108 determines that the item 334 is the target item. The movement module 108 can determine the target item based on different criteria. For example, a history of selections of items (by the specific user, a specific group of users (e.g., based on profession, age group, etc.), users generally), etc.) can be collected and used to predict the probability of each item (either viewable or nonviewable) as being the target item (that is to be selected next by the current user). For example, based on the frequency of prior use, the probability that a given item is the target item can be determined (e.g., Probability (p)=(number of times item was selected)/(# of selectable items). Alternatively or in addition, other criteria can be used to determine the probability of future item selection. For example, there can be certain patterns of usage. As an example, one item is almost always selected after another item. Or, some items are more popular at given times of the month, day, year, time of day, etc. Accordingly, any of a number of different criteria can be applied by the movement module 108 to determine the target item. For example, assume that the user had previously selected an item Z (not shown) and assume that the most likely next selection is the item 334 (based on the user's previous usage, based on a specific group of users' previous usage, etc.). The movement module 108 can then determine that the item 334 is the target item. The operations of the flowchart 200 continue at block 210.

At block 210, the movement module 108 displays a surrogate selectable item at the release point. With reference to FIG. 4, the movement module 108 displays a surrogate selectable item 405 at the release point 402. The surrogate selectable item 405 maps to the target item 334 (the item that has a high probability of being selected next). In this manner, a user only needs to put their finger back down or click the mouse again to select the target item 334—no additional movement is necessary. The surrogate selectable item 405 can be an icon, graphic or some other object (e.g., a button) that when selected performs the same action as the target item 334. In some example embodiments, in order to physically identify the item as a surrogate for the target item 334, the surrogate selectable item 405 can use unique properties (if any) of the target item 334 (e.g., color, shape, text, etc.). In some example embodiments, the movement module 108 can display an arrow pointing from the surrogate selectable item 405 to the target item 334 (as shown in FIG. 4). Also, the surrogate selectable item 405 can be semi-transparent so that the items underneath are not obscured. The operations of the flowchart 200 continue at block 212.

At block 212, the movement module 108 performs an action that is the same as an action that would occur in response to a user selection of the target item (responsive to the user selection of the surrogate selectable item). With reference to FIG. 4, the user can select the surrogate selectable item 405 to perform an action (e.g., opening a new application) that would occur in response to a user selection of the target item 334. Accordingly, the user is not required to move their finger to the target item 334, continue scrolling to locate the target item 334 if not located on the display currently, etc. While described such that a single target item is represent at the release point by a surrogate selectable item, in some other example embodiments multiple target items can be represented by multiple selectable items on or near the release point. For example, the movement module 108 can display the two most probable target items as surrogates at the release point (based on same or different criteria). The operations of the flowchart 200 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for movement reduction as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a user input to cause movement of a display of a screen of a direct manipulation device, wherein the movement is in a direction away from a target item;
   receiving a release input to indicate that a user has released the user input at a release point on the display of the screen;

determining a location of the release point on the display of the screen relative to selectable items;

determining the target item from among the selectable items, wherein the target item is at a distance from the location of the release point, wherein the determining of the target item comprises determining the target item based on a pattern of usage by at least one of the user and group of users;

displaying a surrogate selectable item at the release point, wherein the surrogate selectable item includes a property of the target item that includes at least one of color, shape, and text;

displaying an arrow that originates at the release point from the surrogate selectable item and points to the target item; and responsive to a user selection of the surrogate selectable item, performing an action that is the same as an action that would occur in response to the user selection of the target item.

2. The method of claim 1, wherein the screen is touch sensitive, wherein the user input comprises a user touch of the screen.

3. The method of claim 1, wherein the target item is viewable at least after the movement of the display of the screen.

4. The method of claim 1, wherein the surrogate selectable item is semi-transparent.

5. A computer program product for movement reduction, the computer program product comprising:

a non-transitory computer readable storage medium having computer usable program code embodied therewith, the computer usable program code comprising a computer usable program code configured to:

receive a user input to cause movement of a display of a screen of a direct manipulation device, wherein the movement is in a direction away from a target item;

receive a release input to indicate that a user has released the user input at a release point on the display of the screen;

determine a location of the release point on the display of the screen relative to selectable items;

determine the target item from among the selectable items, wherein the target item is at a distance from the location of the release point, wherein the computer usable program code configured to determine the target item comprises computer usable program code to determine the target item based on a pattern of usage by at least one of the user and group of users;

display a surrogate selectable item at the release point, wherein the surrogate selectable item includes a property of the target item that includes at least one of color, shape, and text;

display an arrow that originates at the release point from the surrogate selectable item and points to the target item; and responsive to a user selection of the surrogate selectable item, perform an action that is the same as an action that would occur in response to the user selection of the target item.

6. The computer program product of claim 5, wherein the screen is touch sensitive, wherein the user input comprises a user touch of the screen.

7. The computer program product of claim 5, wherein the target item is viewable at least after the movement of the display of the screen.

8. The computer program product of claim 5, wherein the surrogate selectable item is semi-transparent.

9. An apparatus comprising:

a screen;

a processor communicatively coupled to the screen; and a movement module executable on the processor, the movement module configured to, receive a user input to cause movement of a display of the screen, wherein the movement is in a direction away from a target item;

receive a release input to indicate that a user has released the user input at a release point on the display of the screen;

determine a location of the release point on the display of the screen relative to selectable items;

determine the target item from among the selectable items, wherein the target item is at a distance from the location of the release point, wherein the movement module configured to determine the target item comprises the movement module configured to determine the target item based on a pattern of usage by at least one of the user and group of users;

display a surrogate selectable item at the release point, wherein the surrogate selectable item includes a property of the target item that includes at least one of color, shape, and text;

display an arrow that originates at the release point from the surrogate selectable item and points to the target item; and responsive to a user selection of the surrogate selectable item, perform an action that is the same as an action that would occur in response to the user selection of the target item.

10. The apparatus of claim 9, wherein the screen is touch sensitive, wherein the user input comprises a user touch of the screen.

11. The apparatus of claim 9, wherein the target item is viewable at least after the movement of the display of the screen.

* * * * *